UNITED STATES PATENT OFFICE.

GEORGE DIEFFENBACH, OF NEW YORK, N. Y.

IMPROVEMENT IN BASES FOR ARTIFICIAL TEETH.

Specification forming part of Letters Patent No. 24,544, dated June 28, 1859.

*To all whom it may concern:*

Be it known that I, GEORGE DIEFFENBACH, of the city, county and State of New York, have invented a new and improved compound applicable to dental bases and to other articles of manufacture; and I do hereby declare that the following is a full, clear, and exact description of my invention and of its application.

Letters Patent of the United States having been granted to me on the 13th day of April, 1858, for an improvement in bases for artificial teeth, and in the schedule annexed to the said Letters Patent, and making part of the same, the said improvement being designated to consist in "forming a proper base for artificial teeth of a composition of matter containing amber as its most prominent ingredient," and having introduced the said amber bases into practice and found that the color of the bases was not sufficiently clear for an exact representation of a natural healthy gum, I have endeavored to obviate this defect; and having ascertained the fact that the presence of sulphur in the said composition was inimical to the preservation of color therein, I have succeeded in making an uncured compound capable of developing and retaining the color incorporated into the same after the hardening process of the said compound is completed.

The nature of my invention consists in making a compound applicable to dental bases and to other articles capable of developing and retaining color or colors incorporated into the compound (while the same is in its soft state) after the curing or hardening of the same.

To enable others skilled in the art to make and use my invention, I will proceed to describe it.

I add to one pound of amber, treated as described in my former patent, about one-half pound of pulverized sulphate of alumina, about one-half pound of purified linseed-oil, about three-fourths of a pound of gutta-percha or caoutchouc and about one-half of a pound of a mixture of metallic colors most nearly resembling the color of the natural healthy gum. The mixture of colors which I have found best for that purpose is as follows: one ounce of sulphide of cadmium, (yellow,) about eight ounces of oxide of tin, about two ounces of vermilion and about two drams of a preparation made as follows: One part, by weight, of gold is dissolved in eighty parts of aqua-regia, (consisting of muriatic and nitric acids,) and the liquid is then dried by evaporation. Water is then added in a sufficient quantity to dilute the mixture, and one hundred and sixty parts of pulverized feldspar is incorporated into and intermixed with the same. The whole mass is then put into a muffle. It is therein exposed to heat until the said mass becomes red-hot or annealed. It is left in that condition until all the acids are evaporated, when it is removed from the heat and pulverized.

If the above-described compound is to be used for dental bases, the coloring-matter above mentioned, or some other composition of mineral colors answering the same purpose, will form a part of the compound; but if the compound be used for other articles of manufacture, other colors may be incorporated into the same, or the intermixture of coloring-matter with the compound may be dispensed with entirely without changing the character of my invention.

If the above-described compound is to be applied to other articles of manufacture but dental plates, gums, &c., its composition may be greatly simplified by the dispensing with either of caoutchouc, or of amber, or of linseed-oil, or of amber and linseed-oil without changing the character of my invention, which consists in making a compound containing sulphate of alumina as an indispensable ingredient. The compound thus formed may consist of the following combination: sulphate of alumina in combination with amber, caoutchouc or gutta-percha, and linseed-oil, with or without coloring-matter; or sulphate of alumina in combination with amber and linseed-oil, with or without coloring-matter; or sulphate of alumina in combination with caoutchouc or gutta-percha, with or without coloring-matter.

If the compound is applied to the making of dental bases, plates, or gums, it is formed and shaped in the manner described in my said patent; if applied to the manufacture of other articles, the forming and shaping of the same is to be performed in the usual manner.

The curing or hardening of the said compound (not herein claimed,) is performed either by the application of steam-heat to the same, or by putting the compound in a hot sand bath during about four hours, which latter method I prefer.

When mineral colors have been incorporated into the compound they will not be visible on the surface after the curing is completed; but the cured compound will present the appearance of a dark hue. To develop the true color I have invented a process, not claimed herein, but described in another application for Letters Patent.

The above-described composition of matter, thus compounded, shaped, cured, hardened, and colored, I apply for dental purposes in the manner described in the patent already referred to; and the manner of applying the same to other purposes will depend upon the nature of the articles for which it is intended.

What I claim herein as my invention, and desire to secure by Letters Patent, is—

The composition of matter consisting of sulphate of alumina and other ingredients, substantially as described, for the purpose as set forth.

Dated New York, February 12, 1859.

GEORGE DIEFFENBACH.

Witnesses:
CHARLES WEHLE,
JUL. WEHLE.